(12) United States Patent
Nagase et al.

(10) Patent No.: US 6,341,524 B1
(45) Date of Patent: Jan. 29, 2002

(54) FUEL GAUGE UNIT FOR A FUEL TANK

(75) Inventors: Yuji Nagase; Shogo Nakamura; Hiroyoshi Kouchi; Kazuyuki Kobayashi, all of Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/238,063

(22) Filed: Jan. 27, 1999

(30) Foreign Application Priority Data

Jan. 27, 1998 (JP) .......................................... 10-029163

(51) Int. Cl.[7] .............................................. G01F 23/32
(52) U.S. Cl. ......................................... 73/317; 116/229
(58) Field of Search ................................ 116/229, 282, 116/261; 73/317, 318

(56) References Cited

U.S. PATENT DOCUMENTS

| | | | | |
|---|---|---|---|---|
| 943,868 A | * | 12/1909 | Garlick | 73/317 |
| 1,020,785 A | * | 3/1912 | Warden | 73/317 |
| 1,202,854 A | * | 10/1916 | Knight | 73/317 |
| 4,441,364 A | | 4/1984 | Montie | 73/313 |
| 4,574,631 A | | 3/1986 | Johnson | 73/317 |
| 4,790,184 A | | 12/1988 | Nakanishi | 73/317 |
| 5,025,764 A | | 6/1991 | Kobayashi | 123/198 R |

FOREIGN PATENT DOCUMENTS

| | | | | |
|---|---|---|---|---|
| CH | 286162 | * | 2/1953 | 73/317 |
| JP | 62-51030 U | | 3/1987 | |

OTHER PUBLICATIONS

Patent Abstracts of Japan, Abstract of JP 9–222348, published Aug. 26, 1997.

* cited by examiner

*Primary Examiner*—Herzon Williams
*Assistant Examiner*—Willie Morris Worth
(74) *Attorney, Agent, or Firm*—Crowell & Moring LLP

(57) ABSTRACT

A fuel gauge unit for a fuel tank which, when the gauge unit is attached to the fuel tank, is fixed in its rotational angle in a simple fashion, and in which the fuel scale is simple and easy to inspect visually. An indicator is provided which moves back and forth in a horizontal plane when a bearing connected to a float rotates. The position of the indicator corresponds to a fuel scale, so that the quantity of fuel in the fuel tank can be determined by inspecting the gauge. On the top of the gauge unit is a protruding rectangular portion with a transparent window. This protruding rectangular portion engages in a hole in the cover plate attached to the fuel tank. The protruding rectangular portion and its hole may have a rectangular or oblong surface which serves as a rotational position lock for the gauge unit.

3 Claims, 3 Drawing Sheets

FUEL GAUGE UNIT FOR A FUEL TANK

FIELD OF THE INVENTION

This invention concerns a fuel gauge unit to provide a visual indication of the quantity of fuel in a fuel tank fixed on the top of a small multi-purpose single-cylinder engine.

BACKGROUND OF THE INVENTION

FIGS. 3 and 4 show the configuration of a prior art fuel gauge unit which is used in small multi-purpose singlecylinder engines (hereinafter called simply "engines"). FIG. 3 is a plan view showing the main components; FIG. 4 is a cross section taken along line A—A in FIG. 3.

In FIGS. 3 and 4, 1 is the fuel tank installed on top of the engine; it is made of synthetic resin, i.e. plastic, and welded. On the top of the fuel tank 1 are a fuel inlet, which has a cap 2 and a fuel filter 3, and a fuel gauge unit 4. The fuel gauge unit 4 comprises cover plate 6, which is made of a flat material; a gauge body 7, formed from molded resin, which has a transparent window 7a; a guide cylinder 11, which has a long hole in its bottom to guide the arm of indicator 12a; a cylindrical packing 8, which seals the guide cylinder; a shaft 9, which extends through both the aforesaid gauge body 7 and the guide cylinder 11 and holds both in place: and an indicator bearing 12, which is supported by the shaft 9 so that it is free to rotate, and to which are fixed the indicator 12a and the float 12b, which sits on the surface of the fuel in fuel tank 1.

In this engine, when fuel gauge unit 4 is mounted to the fuel tank 1, it is pressed into the fuel tank with packing 8 around and in front of it. Cover plate 6 is placed on top of the gauge body 7. Tabs provided in appropriate places on the mounting surface of fuel tank 1 engage in holes in the cover plate 6. While plate 6 is being pressed onto the upper surface of gauge body 7, the tabs are heated to melt them into place. (Alternatively, holes may be provided in appropriate places on the mounting surface of the fuel tank 1, and cover plate 6 may be fixed in place by means of screws or rivets.)

With the aforesaid fuel gauge unit 4, when the fuel tank 1 is full, float 12b will float and indicator bearing 12 will rotate. Indicator 12a, which is attached to the bearing 12, will move in the horizontal direction and point to the "F" on transparent window 7a, which indicates that the fuel tank is full. As the engine uses the fuel, indicator 12a will move in the downward direction in FIG. 3, and when the fuel tank is empty, indicator 12a will point to the "E" on transparent window 7a, which indicates that the fuel tank is empty. In other words, the fuel gauge unit 4 allows the user to visually ascertain whether there is fuel in fuel tank 1 and how much fuel there is.

As can be seen in FIGS. 3 and 4, fuel gauge unit 4 must be cylindrical so that it can be sealed against the fuel, and the seal is constructed using packing 8 or O rings. Thus, when the fuel gauge unit 4 is installed on fuel tank 1, there is no way to control the direction of rotation of the gauge with respect to the fuel tank.

This is why the prior art fuel gauge shown in FIGS. 3 and 4 has projections in given positions along its circumference, so that the gauge body 7 is asymmetrical with respect to its center line. This requirement drives up the cost of fuel gauge unit 4.

Furthermore, because the user must visually ascertain the level of the fuel in fuel tank 1, the prior art fuel gauge must have a fuel scale (the aforesaid "F" or "E") engraved or printed on the top of gauge body 7 or a separate plate with a scale must be made and installed. This drives up the cost of constructing the fuel gauge.

SUMMARY OF THE INVENTION

The object of this invention is to provide a fuel gauge for a fuel tank with a simple configuration that will make it easy to control the rotational position of the gauge when it is fixed to the fuel tank, that will have a simple and inexpensive fuel scale, and that will allow the fuel level to be determined with certainty.

To solve the problems described above, a first preferred fuel gauge embodiment for a fuel tank of the sort in which a bearing for an indicator connected to a float that sits atop the fuel in the fuel tank is supported by the gauge so that it is free to rotate. When the bearing rotates, the indicator connected to the bearing moves back and forth horizontally. The position of the indicator is correlated with a fuel scale, so that the quantity of fuel in the fuel tank can be ascertained visually. This fuel gauge is distinguished by the fact that there is a transparent window in the upper portion of the aforesaid gauge which protrudes upward, and by the fact that there is a hole in the cover plate affixed to the fuel tank in which the protruding portion of the gauge fits. The surface of the protruding portion and the hole in which it fits may be square or elongated.

A second preferred fuel gauge embodiment according to the invention is a fuel gauge described as the foregoing first preferred embodiment, but in which the fuel scale is provided on the cover plate, so that it corresponds to the position of the fuel indicator as viewed through the window.

With this invention, when the fuel gauge is installed on the fuel tank, the protruding portion of the gauge fits into the hole in the cover plate. The protruding portion and the hole together form a rotation stopper. When they are fitted together, the rotational position of the gauge, that is, of the fuel gauge with respect to the fuel tank (or rather to the cover plate), is determined by itself, and they function as a rotation stopper.

With this invention, then, there is no need to create protuberances or asymmetries in the gauge so that its rotational position can be determined, as is the case with prior art gauges. When the protruding portion is fitted into the hole, the rotational position of the gauge is determined, and a reliable rotation stopper is created.

Because the rest of the protruding portion of the gauge, i.e. the part of it not occupied by the window, is masked by the cover plate, it is easy to read the indicator, which improves the handling qualities of the gauge.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

In this section a detailed explanation of the preferred embodiments of this invention will be given with reference to the drawings. To the extent that the dimensions, materials, shape and relative position of the components described in this embodiment are not definitely fixed, the scope of the invention is not limited to those specified, which are meant to serve merely as illustrative examples.

Figure 1:
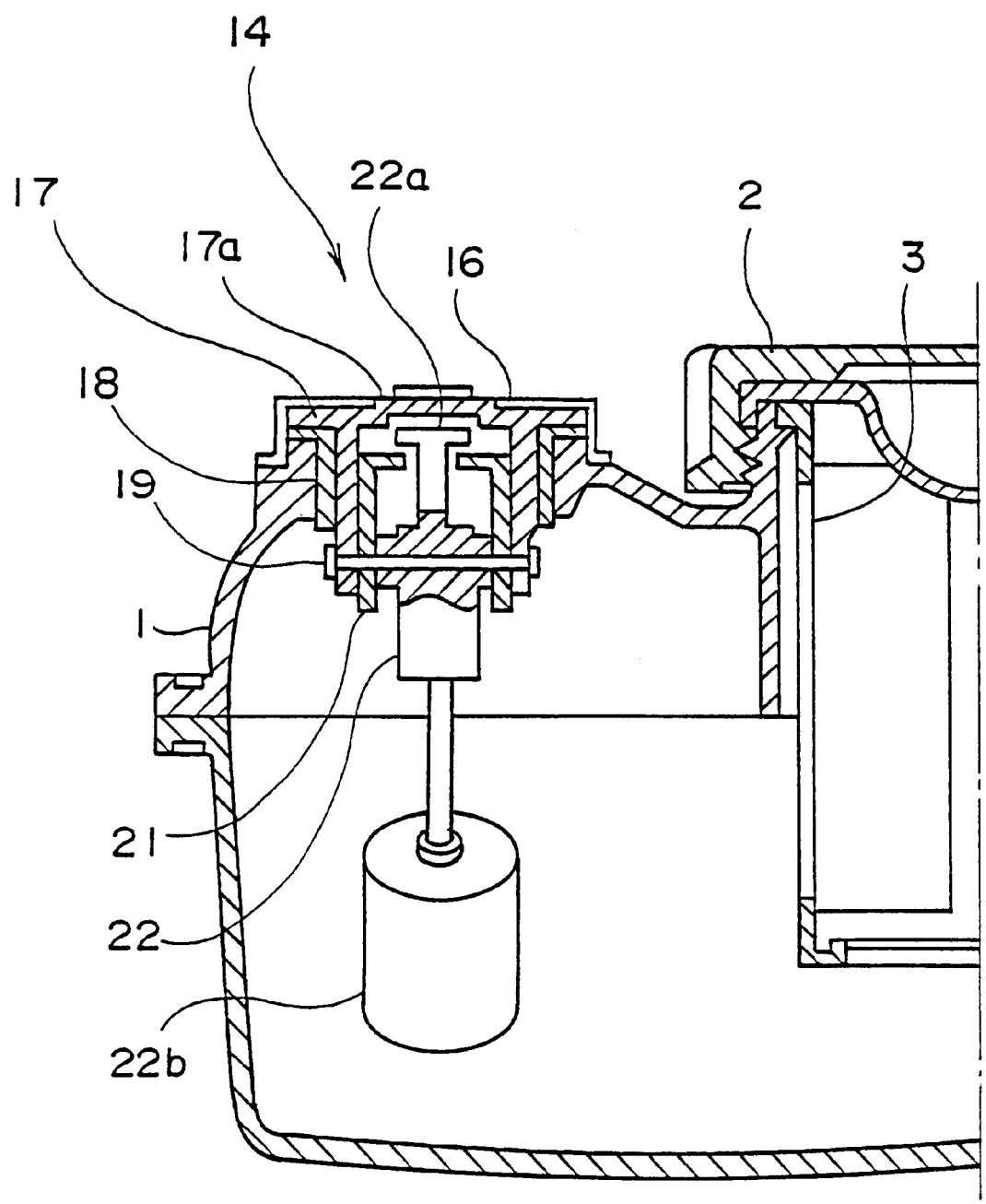
FIG. 1 is a cross section of the essential parts near the mounting of a fuel gauge unit on a fuel tank which constitutes a preferred embodiment of this invention.
Figure 2:
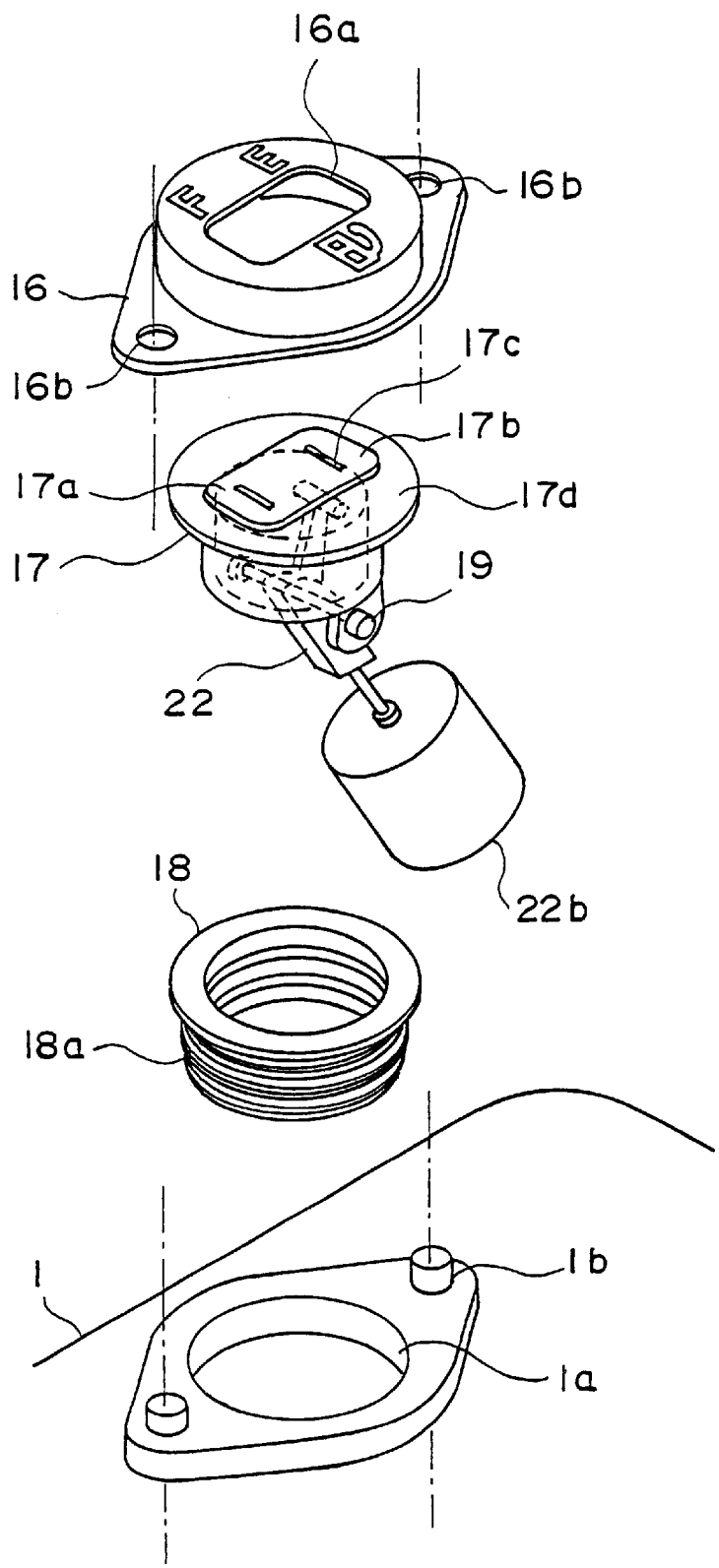
FIG. 2 is an exploded perspective drawing of the fuel gauge in the embodiment of FIG. 1.
Figure 3:
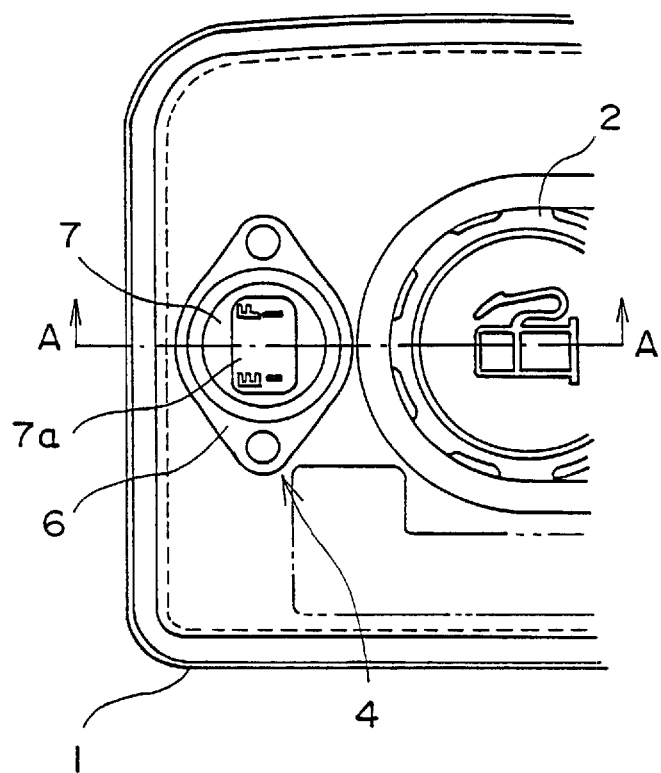
FIG. 3 is a plan view showing the main components in the vicinity where the fuel gauge unit is mounted on a prior art fuel tank.
Figure 4:
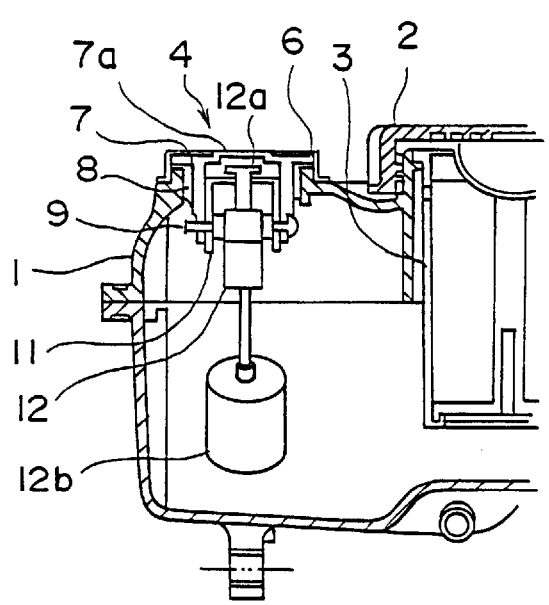
FIG. 4 is a cross section taken along line A—A in FIG. 3.

FIG. 1 is a cross section of the essential parts near the mounting of a fuel gauge for a fuel tank which constitutes a preferred embodiment of this invention. FIG. 2 is an exploded perspective drawing of the fuel gauge of FIG. 1.

In FIGS. 1 and 2, 1 is a molded resin fuel tank which is mounted on top of an engine. On top of the fuel tank 1 are a fuel supply inlet with a cap 2 and a fuel filter 3 and a fuel gauge unit 14. The fuel gauge unit 14 comprises a cover plate 16, which is a molded plate; a gauge body 17, which is formed from a transparent synthetic resin and which has a window 17a; an interior guide cylinder 21, which fits into the gauge body 17, and which has a long hole in its raised bottom to guide the arm of indicator 22a; a cylindrical packing 18, which seals the gauge against the fuel; a shaft 19, which extends through the gauge body 17 and the interior guide cylinder 21, and whose ends are anchored in place; and an indicator bearing 22, which is supported by the shaft 19 in such a way that it is free to rotate, and to which is fixed float 22b, which sits on the surface of the fuel in fuel tank 1.

There is a rectangular hole 16a in the cover plate 16. On the upper surface of the cover plate 16 are engraved the letters "E" and "F", which serve as a fuel scale to indicate an empty or a full tank. There are two mounting holes 16b in the flange. On transparent window 17a of the gauge body 17 are concave or convex level lines 17c, which correspond to the positions of the "E" and "F" engraved on the cover plate 16.

On the upper surface 17d of gauge body 17 is a protruding rectangular portion 17b, which is elevated above the upper surface 17d by a fixed amount. The protruding rectangular portion 17b has dimensions which allow it to fit exactly into the rectangular hole 16a in the cover plate 16. The engagement of protruding rectangular portion 17b in hole 16a determines the rotational angle of the gauge body 17 and forms a rotational position.

With this sort of engine, when the fuel gauge unit 14 is installed on fuel tank 1, it is pressed into mounting hole 1a of fuel tank 1 with packing 18 all around it. Gauge body 17 is then covered by cover plate 16, and pins 1b, which are provided in appropriate places on the mounting surface of fuel tank 1, engage in holes 16b in plate 16. While cover plate 16 is being pressed onto the upper surface of gauge unit 17, the pins 1b are heated to melt them into place. On the inner and outer periphery of the cylindrical portion of packing 18, in the circumferential direction, are one or more rings 18a with a pyramidal cross section. The purpose of these rings is to assure the seal between fuel tank 1 and fuel gauge unit 14.

When the fuel gauge unit 14 is installed on fuel tank 1, protruding rectangular portion 17b on the top of gauge body 17 is pressed into rectangular hole 16a in cover plate 16, and cover plate 16 presses against gauge body 17 to fix the fuel gauge unit 14 to fuel tank 1.

The engagement of the protruding rectangular portion 17b in hole 16a causes the gauge body 17 to be locked in the proper rotational position. When the portion of the gauge body 17 other than window 17a is covered by cover plate 16, indicator 22a can easily be seen.

In this invention, it is not necessary to provide tabs on the gauge body 17 or shape it in such a way that it cannot rotate in order to fix the rotational position of fuel gauge unit 14, as was required in the prior art. When protruding rectangular portion 17b of the gauge body 17 fits into hole 16a, the rotational position is easily determined.

With this fuel gauge, when fuel tank 1 is full, float 22b rises to the surface, causing bearing 22 to rotate. Indicator 22a, which engages bearing 22, points to the "F" on cover plate 16 next to window 17a. As the fuel is burned, indicator 22a moves to the right. When fuel tank 1 is empty, indicator 22a points to the "E" next to window 17a. In this way the user can visually ascertain whether there is any fuel in fuel tank 1 or how much fuel is left.

As has been discussed above, with this invention, when the fuel gauge unit is installed on the fuel tank, its protruding rectangular portion fits into a hole in the cover plate, so it is held in the correct position without any further adjustment. The cover plate presses down on the gauge body to fix it to the fuel tank. This design has the effect of locking the orientation of the gauge body with respect to the fuel tank. There is no need, as was the case with prior art designs, to provide tabs on the inner periphery of the gauge or to make the engaging portions of the gauge asymmetrical. This allows a fuel gauge to be realized at lower cost.

Because the portion of the gauge other than the window through which the indicator is viewed is covered by the cover plate, the indicator is easier to see. And because a scale which goes from "E" to "F" is engraved on the cover plate, no extra plate for markings on it is needed. This also contributes to lowering the cost of the gauge.

The foregoing description and examples have been set forth merely to illustrate the invention and are not intended to be limiting. Since modifications of the described embodiments incorporating the spirit and substance of the invention may occur to persons skilled in the art, the scope of the invention should be construed broadly to include all variants falling within the appended claims and equivalents thereof.

What is claimed is:

1. A fuel gauge unit for visually indicating a quantity of fuel in a fuel tank, said fuel gauge unit comprising:

a cylindrical gauge body having an elongated, upwardly protruding upper portion of rectangular or oblong shape having a transparent window;

an indicator supported on said gauge body so as to be freely rotatable;

a float which is capable of floating atop the fuel and which is connected to said indicator; and a cover plate capable of being affixed to said fuel tank and covering said gauge body, said cover plate having a rectangular or oblong shaped aperture through which said indicator can be visually recognized;

wherein said elongated protruding portion of said gauge body engages in said aperture of said cover plate to stop the fuel gauge unit from rotating relative to said.

2. A fuel gauge unit for a fuel tank according to claim 1, wherein said cover plate is provided with a fuel scale, and said transparent window has a level line corresponding to said fuel scale.

3. A fuel gauge unit for visually indicating a quantity of fuel in a fuel tank, said fuel gauge unit comprising:

a gauge body having an elongated, upwardly protruding upper portion of rectangular or oblong shape having a transparent window, a lower part of said gauge body being formed to be a cylindrical guide part which is insertable into a mounting bore with a packing, said gauge body being supportable by an upper face of the fuel tank by a flange part of said packing and being rotatable in the bore of said packing;

an indicator supported on said gauge body so as to be freely rotatable;

a float which is capable of floating atop the fuel and which is connected to said indicator; and a cover plate having an aperture of rectangular or oblong shape through which said indicator can be visually recognized, said aperture engaging the protruding portion of rectangular or oblong shape of said gauge body to prevent turning of the gauge body, said cover being fixable to the upper face of the fuel tank to define the location of and to fix said gauge body.

* * * * *